Aug. 18, 1942. L. P. GROBEL Re. 22,161

DYNAMOELECTRIC MACHINE

Original Filed Aug. 1, 1939

Inventor:
Lloyd P. Grobel,
by Harry E. Dunham
His Attorney.

Reissued Aug. 18, 1942

Re. 22,161

UNITED STATES PATENT OFFICE 22,161

DYNAMOELECTRIC MACHINE

Lloyd P. Grobel, Schenectady, N. Y., assignor to General Electric Company, a corporation of New York Original No. 2,199,156, dated April 30, 1940, Serial No. 287,735, August 1, 1939. Application for reissue November 15, 1940, Serial No. 365,817

15 Claims. (Cl. 171—252)

Figure 1:
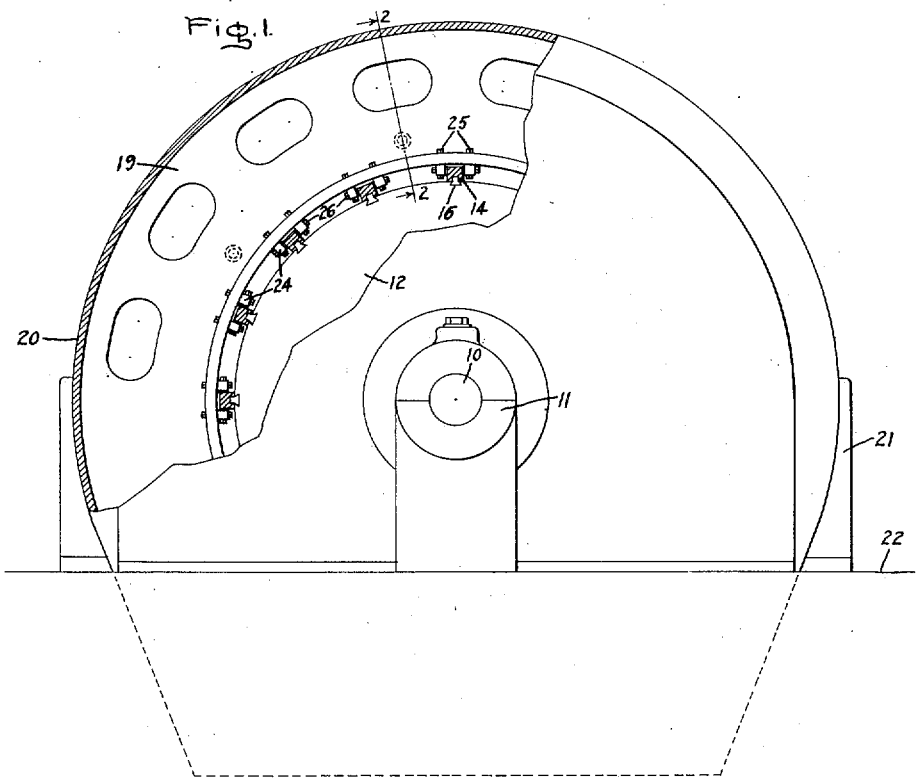

My invention relates to improvements in dynamoelectric machines, and particularly to an arrangement for minimizing the effect on the support of such machines of electromagnetic distortions and vibrations produced by a rotating magnetic field in such machines.

In certain types of dynamoelectric machines, considerable vibration may be set up in the stationary member of the machine by electromagnetic distortions which are created by the rotating magnetic field set up either by the rotatable member of the machine or by currents in a stationary member winding. This is particularly noticeable in two pole machines wherein the rotatable member is excited to provide two magnetic poles which rotate within a stationary member formed of magnetic material. The magnetic attractive force of the rotor is proportional to the square of the flux density, and therefore, is always positive. This magnetic attractive force tends to distort the stator substantially into an elliptical form, and this deformation rotates about the stationary member producing two vibrations at any fixed point thereon for each revolution of the rotor. If these vibrations are transmitted through the stationary member to the supporting foundation, the foundation and other equipment supported thereby may be subjected to undesirable vibratory forces and noise. The stationary member of such a machine usually is provided with a laminated core in which the armature winding is arranged, and this assembly is mounted within a stationary supporting frame. It generally has been accepted that if the stiffness of the stationary member can be increased, the distortion thereof due to the rotating magnetic field may be reduced correspondingly. It has been found, however, that the rigid connection between the laminated core and the supporting frame does not provide an element having a deep beam stiffness, but rather the effect of a combination of two beams, one above the other, so that the resultant stiffness is merely the sum of the stiffness of the two elements. By actual tests, it has been found that the stiffness of a conventional laminated core in this type machine may be seven or more times that of a supporting frame, and therefore, the stiffening of the frame adds relatively little to the resultant stiffness of the stationary member of the machine.

In order to minimize the transmission of vibrations which are produced by the deformation of the laminated core of a stationary member in this type of machine, I provide a plurality of flexible beam springs for flexibly supporting the core upon the stationary supporting frame. These supporting springs are arranged to allow only relatively small deflections of the core due to the weight thereof, and also should avoid torsional resonance with any pulsating torques which may occur due to short circuits or unbalanced operation. It has been found that with two pole machines of this type, the stationary core vibrates with a four-node vibration which is not entirely radial, but that the nodal points have tangential displacements equal to about one-half the maximum radial displacements thereof. By supporting the laminated core within the stationary supporting frame on a flexible support which provides these characteristics, very little vibration will be transmitted to the stationary supporting frame, so that the transmission of magnetic vibratory forces to the foundation of the machine and noises incident thereto is substantially eliminated.

An object of my invention is to provide a dynamoelectric machine having an improved arrangement for supporting a stator core within a stator frame.

Another object of my invention is to provide an improved flexible support for a magnetic core subjected to vibratory forces to minimize the transmission of such forces between the core and its supporting frame.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 2:
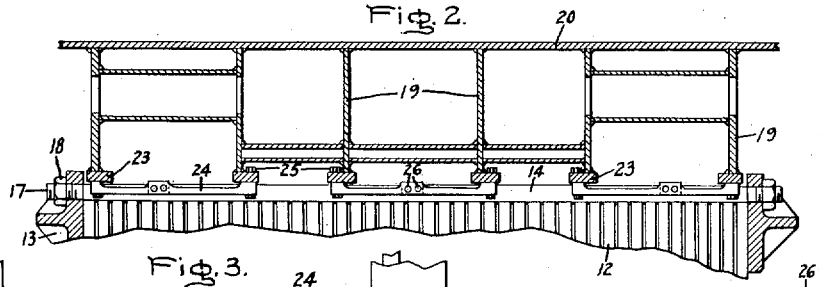
Figure 3:
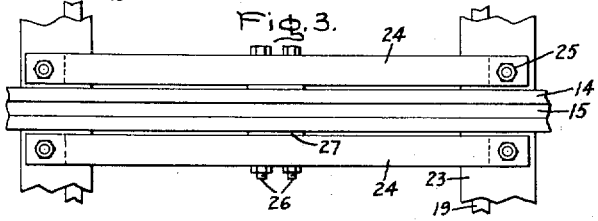
Figure 4:
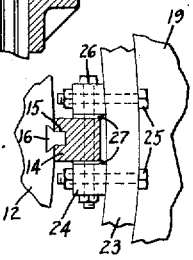
Figure 5:
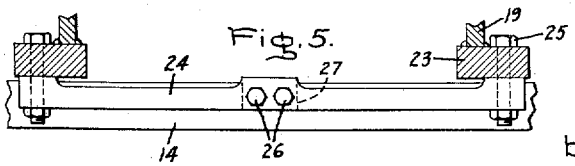

In the drawing, Fig. 1 is an end view, partially broken away, of a dynamoelectric machine provided with an embodiment of my improved stationary member and supporting arrangement; Fig. 2 is a partial sectional view taken along line 2—2 of Fig. 1; Fig. 3 is a fragmentary view showing the relative arrangement of my improved supporting springs and their connection to the frame and core of the stationary member; Fig. 4 is a fragmentary enlarged end view of my improved flexible supporting elements and their connection to the frame and core as shown in Figs. 1 and 2; and Fig. 5 is a fragmentary side elevational view of the elements illustrated in Fig. 3.

Referring to the drawing, I have shown my invention in connection with a dynamoelectric machine having a rotatable member supported by a shaft 10. The rotatable member shaft is supported by pedestal bearings mounted in bearing housings 11 arranged at each end of the machine. The rotatable member is provided with a magnetic core and an exciting winding, and is arranged to react electrodynamically with the stationary member, which is provided with an armature winding supported in a laminated magnetic core mounted in a stationary supporting frame. The laminated core includes a plurality of laminations 12 which is secured in assembled relation between end plates 13 at each end thereof and drawn together by a plurality of clamping bars 14. A plurality of these bars is arranged in circumferentially spaced apart relation about the periphery of the laminated core, and each bar is formed with a groove 15 into which is secured a dovetail key 16 which also is fitted into a dovetail groove in the outer edge of the laminations 12. The outer ends 17 of the clamping bars 14 are threaded and extend through openings formed in the end plates 13. The stiffness of the magnetic core may be adjusted by changing the pressure with which the laminations are clamped together. This pressure should be such that no substantial displacement occurs between adjacent laminations due to the electromagnetic distortion of the core in order to prevent chafing of the insulation on the armature winding arranged in the slots of this core. The clamping pressure between the two end plates 13 may be varied by adjusting nuts 18 which engage the threaded ends 17 of the clamping bars 14. The stationary supporting frame includes a plurality of annular supporting and stiffening plates 19 arranged in longitudinally spaced apart relation and secured within an outer wrapper plate 20. This supporting frame is provided with feet 21 on each side thereof, which are mounted upon a supporting foundation 22. To provide a flexible support which is substantially rigid longitudinally of the stationary member, I provide a mounting ring 23 welded to the inner edge of each of the plates 19 and a plurality of beam springs 24 arranged in longitudinally spaced apart sets and circumferentially spaced apart relation about the laminated core in each of these sets. These beam springs 24 are arranged in pairs, one on each side of a bar 14, and are formed with an enlarged portion adjacent each end and adjacent the central portion thereof. These beam springs 24 are secured adjacent the ends thereof to the supporting rings 23 by bolts 25 which extend through the enlarged ends and are secured adjacent the central portion thereof to the bars 14 by bolts 26, which extend through the enlarged central portion of the springs and through the clamping bars 14. A spacing block 27 is arranged between each of the springs 24 and the adjacent clamping bar 14 to provide a slight clearance between the spring and the bar to allow for slight tangential flexing of the springs 24 without resulting in contact between the springs and the bars 14. In order to provide the desired radial and tangential flexibility to the supporting arrangement, the beam springs 24 are constructed so that their flexibility is substantially twice as great in a radial direction as in a tangential or circumferential direction with respect to the laminated core. This is obtained by making the springs 24 substantially twice as wide in a tangential direction as they are deep in a radial direction, as can readily be seen from Figs. 3 and 5. The relative flexibility of this spring supporting arrangement in the tangential and radial directions is not my invention, but is the invention of Chester W. Rice, and forms the subject of his copending application Serial No. 287,767, filed August 1, 1939, and assigned to the same assignee as this application. This arrangement of flexible springs provides a support for the laminated core which is substantially rigid longitudinally thereof and flexible radially and tangentially thereof, with the radial flexibility substantially greater than the tangential flexibility of the support. Furthermore, it allows for slight tangential and radial displacements of the laminated core within the stationary supporting arrangement, so that very little vibration is transmitted to the supporting frame and foundation 22.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having a rotatable member and a stationary member, said stationary member being provided with a frame and a core arranged within said frame, and means for supporting said core in said frame substantially rigidly longitudinally thereof, said supporting means being flexible substantially radially and tangentially of said core.

2. A dynamoelectric machine having a rotatable member and a stationary member, said stationary member being provided with a frame and a core arranged within said frame, and means arranged at spaced apart points for supporting said core in said frame substantially rigidly longitudinally thereof, said supporting means being flexible substantially radially of said core.

3. A dynamoelectric machine having a rotatable member and a stationary member, said stationary member being provided with a frame and a core arranged within said frame, and means arranged at circumferentially and longitudinally spaced apart points for directly supporting said core in said frame, said supporting means being flexible radially of said core and providing a substantially rigid support longitudinally thereof.

4. A dynamoelectric machine having a rotatable member and a stationary member, said stationary member being provided with a frame and a core arranged within said frame, and means including beam springs for supporting said core in said frame, said springs being arranged to provide a substantially rigid core support longitudinally thereof.

5. A dynamoelectric machine having a rotatable member and a stationary member, said stationary member being provided with a frame and a core arranged within said frame, and means including beam springs extending longitudinally of said core and arranged at circumferentially spaced apart points for flexibly supporting said core in said frame.

6. A dynamoelectric machine having a rotatable member and a stationary member, said stationary member being provided with a frame and a core arranged within said frame, and means including beam springs extending longitudinally of said core and secured to said frame and to said core for supporting said core in said frame, said beam spring supporting means being flexible radially of said core.

7. A dynamoelectric machine having a rotatable member and a stationary member, said stationary member being provided with a frame and a core arranged within said frame, and means including beam springs arranged at longitudinally spaced apart points for flexibly supporting said core directly on said frame, said beam spring supporting means being flexible radially and tangentially of said core.

8. A dynamoelectric machine having a rotatable member and a stationary member, said stationary member being provided with a frame and a core arranged within said frame, and means including a plurality of beam springs arranged at circumferentially and longitudinally spaced apart points for supporting said core in said frame substantially rigidly longitudinally thereof, said beam spring supporting means being flexible radially of said core.

9. A dynamoelectric machine having a rotatable member and a stationary member, said stationary member being provided with a frame element and a core element arranged within said frame, and means including beam springs secured adjacent the ends thereof to one of said elements and secured intermediate the ends thereof to the other of said elements for supporting said core element directly on said frame element.

10. A dynamoelectric machine having a rotatable member and a stationary member, said stationary member being provided with a frame element and a core element arranged within said frame, and means including a plurality of circumferentially spaced apart beam springs secured adjacent the ends thereof to one of said elements and secured intermediate the ends thereof to the other of said elements for supporting said core element directly on said frame element, said beam spring supporting means being flexible radially of said core element.

11. A dynamoelectric machine having a rotatable member and a stationary member, said stationary member being provided with a frame and a core arranged within said frame, and means including a plurality of beam springs secured to said frame adjacent the ends thereof and to said core intermediate the ends thereof for supporting said core directly on said frame, said beam springs being arranged in longitudinally spaced apart sets and being arranged in circumferentially spaced apart relation in each of said sets.

12. A dynamoelectric machine having a rotatable member and a stationary member, said stationary member being provided with a frame, a laminated core arranged within said frame, means for securing and retaining said laminated core in assembled relation, and means secured to said frame and to said core assembly retaining means for flexibly supporting said core directly on said frame.

13. A dynamoelectric machine having a rotatable member and a stationary member, said stationary member being provided with a frame, a laminated core arranged within said frame, means for securing and retaining said laminated core in assembled relation, and means including a plurality of beam springs secured adjacent the ends thereof to said frame and secured intermediate the ends thereof to said core assembly retaining means for flexibly supporting said core directly on said frame.

14. A dynamoelectric machine having a rotatable member and a stationary member, said stationary member being provided with a frame, a laminated core arranged within said frame, means for securing and retaining said laminated core in assembled relation, and means including a plurality of beam springs secured adjacent the ends thereof to said frame and secured intermediate the ends thereof to said core assembly retaining means for supporting said core directly on said frame, said beam springs being arranged in longitudinally spaced apart sets and being arranged in circumferentially spaced apart relation in each of said sets.

15. A dynamoelectric machine having a rotatable member and a stationary member, said stationary member being provided with a frame element, a laminated core element arranged within said frame element, means for securing and retaining said laminated core element in assembled relation, and means including a plurality of beam springs secured adjacent the ends thereof to one of said elements and secured intermediate the ends thereof to the other of said elements for supporting said core element in said frame element.

LLOYD P. GROBEL.